Patented June 14, 1932

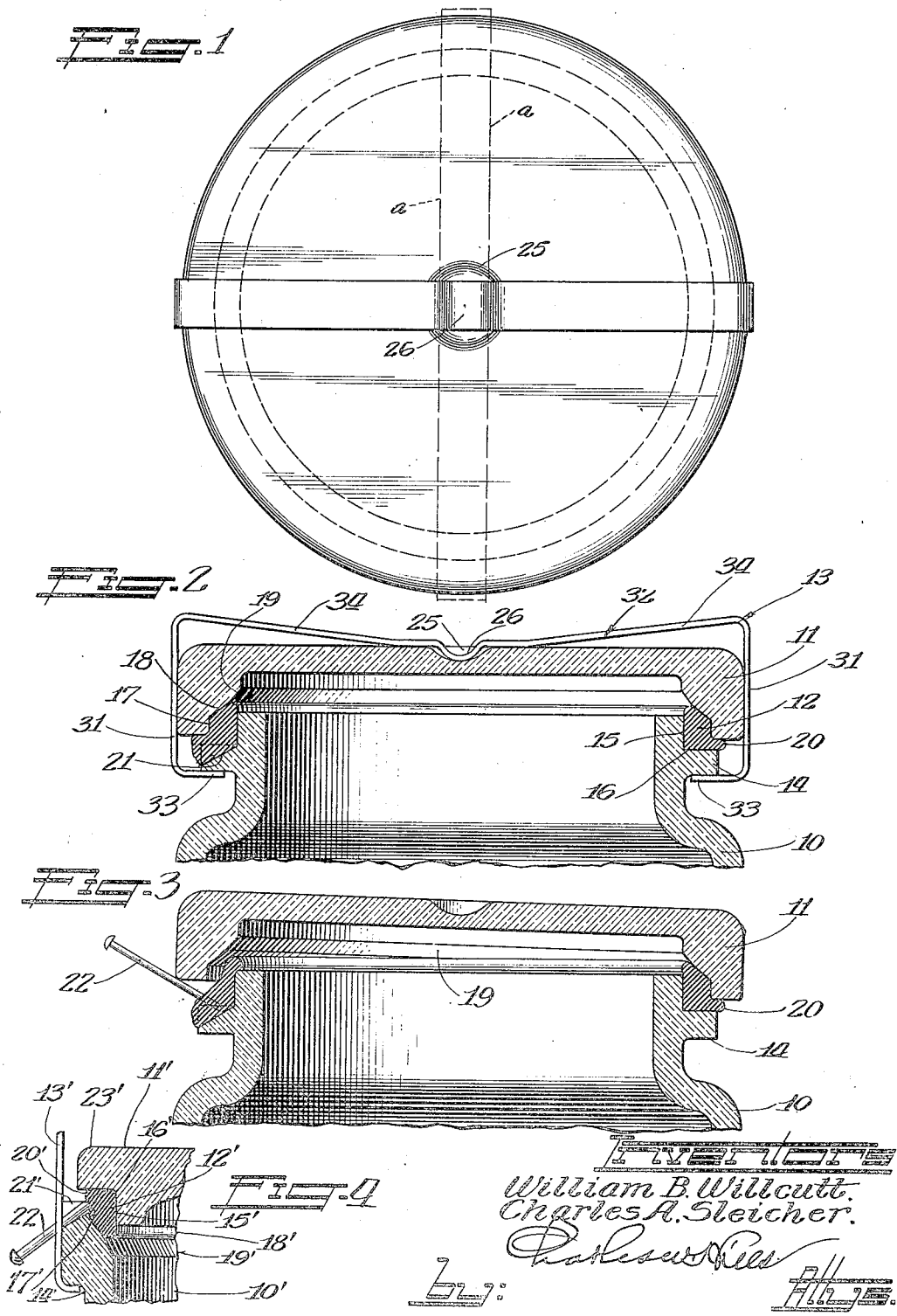

1,862,560

UNITED STATES PATENT OFFICE

WILLIAM B. WILLCUTT, OF NEW YORK, AND CHARLES A. SLEICHER, OF TROY, NEW YORK, ASSIGNORS TO VACUUM SEAL COMPANY, INC., OF NEW YORK, N. Y., A CORPORATION OF NEW YORK

VACUUM JAR

Application filed May 24, 1929. Serial No. 365,622.

Our present invention relates in general to a vacuum jar construction and more particularly to a seal therefor.

An object of our invention is to improve the seal between the cover and container of a vacuum jar.

Another object of the invention resides in the provision of a vacuum jar having means for compressing the gasket between the cover and container of the jar in such a manner that after the jar has been sealed any fluid tending to leak into or out of the container must follow a tortuous path thereby greatly minimizing the possibility of leakage of such fluid into or out of the container.

A further object of our invention relates to the provision of a notch in the jar itself instead of in the cover as is now the practice arranged to receive an instrument such as a pin for breaking the seal between the cover and container of the jar.

Another and still further object of our invention is to provide an improved vacuum jar embodying the above noted features adapted for use in connection with our novel spring clamp disclosed and claimed in our copending patent application.

In accordance with the general features of our invention there is provided a vacuum jar construction comprising a container having its upper end shouldered to receive a gasket and a cover provided with a plurality of differently inclined annular surfaces on its interior for engaging and compressing the gasket on the upper end of the container whereby the gasket is pressed into a wedge-like shape and is forced to bulge outwardly between the lower edge of the cover and the shoulder on the container.

Another feature of the invention relates to the idea of providing the upper end of the container with a notch disposed in line with the shoulder on the container whereby an instrument may be inserted in said notch for the purpose of breaking the seal between the gasket and the cover on said container.

Figure 1 is a plan view of a vacuum seal jar of the type to which our invention applies.

Figure 2 is a fragmentary vertical sectional view taken through the upper end of the vacuum seal jar shown in Figure 1.

Figure 3 is a fragmentary sectional view similar to Figure 2 illustrating how a pin may be inserted in a notch in the upper end of the jar for the purpose of breaking the seal established by the gasket.

Figure 4 is a fragmentary sectional view of a modification of the invention illustrating the use of the notch in the upper end of a container of a vacuum jar construction of the internal seal type.

As shown on the drawing, the reference character 10 designates generally a jar or container which may be made of any suitable material such for example as glass. Positioned over the open end of the jar 10 is a glass cover or top 11 which is designed to rest on a gasket 12 made of a resilient substance such as rubber. It is to be noted that although the vacuum jar construction illustrated in Figure 2 is of the outside seal type, our invention with reference to the notch in the upper end of the container is not to be limited to this type of jar for it may be used with equal advantage in connection with a vacuum jar of the internal seal type as shown in Figure 4.

The cover is illustrated as being connected to the jar by means of a spring clamp 13 embodying the features of our invention disclosed in our copending patent application.

The upper and open end of the jar or container 10 is provided with an annular exterior flange 14 for cooperation with the spring clamp 13. This flange 14 cooperates with an annular vertical surface 15 on the upper end of the container 10 to define a shoulder 16 comprising a seat for the gasket 12.

The cover 11 has formed on its interior a vertical annular surface 17 terminating at one end in an inclined annular surface 18. This surface 18 in turn terminates in a differently inclined surface 19 as is clearly shown in Figure 2. It will be evident from Figure 2 that when the gasket 12 is compressed upon its seat 16 by the cover 11 the gasket is forced to assume a wedge-like shape or in other words is distorted along the inclined surfaces 18 and 19. Moreover, the more the gasket 12 is compressed the more it will be distorted along the inclined surface 19. Then, too, the compression of the gasket 12 results in a portion of it bulging between the lower edge of the cover and the flange 14 on the container as indicated at 20. This annular bulging portion 20 serves to augment the seal established between the cover 11 and the container 10 and also serves as a cushion for the lower edge of the cover.

The inclined surfaces 18 and 19 are advantageous in several respects. In the first place, they tend to hold the gasket in place and thus augment the seal. In the second place, after the cover has been sealed to the jar or container, these surfaces 17, 18, and 19, minimize the possibility of the leakage of any fluid into or out of the container due to the fact that in order for fluid to leak into or out of the container it is necessary for such fluid or seepages to follow a tortuous path defined by the three cooperating surfaces 17, 18, and 19.

The annular flange 14 of the container 10 is provided with a recess or notch 21 arranged to receive an instrument such as a pin 22 (Figure 3) to enable the breaking of the seal established by the compressed gasket 12 whenever it is desired to remove the cover 11 from the container. The breaking of the seal may be accomplished by using the pin 22 to force a portion of the gasket 12 into the recess or slot 21 or then again the pin may be used to push the gasket upwardly away from its seat 16.

The top of the cover 11 is provided with a central semi-spherical depression 25 arranged to receive a central projection 26 formed in the spring clamp 13 which will now be described in detail.

The clamp 13 comprises a U-shaped construction including parallel spaced legs 31—31 and a connecting element 32 between these legs. The free end of each of the legs 31 is bent inwardly and laterally at right angles to the legs proper as indicated at 33. These lateral portions 33 of the legs 31 serve to engage the annular shoulder 14 on the jar 10 when the clamp is in position (Figure 2). The connecting element 32 of the clamp comprises two oppositely and downwardly inclined portions 34—34 terminating in the central projection 26 which engages in the semi-spherical depression 27 in the top of the cover 11.

In general the spring clamp 13 may be made of any suitable material such for example as steel or bronze strip. Of course it is to be undertsood that the pressure exerted by the spring on the cover can be predetermined and altered by the shape of the spring, the material used, and the thickness or width of the band.

From the illustration in Figure 2 it will be evident that the upper ends of the legs 31 of this spring clamp are spaced from the top of the cover 11 so as to afford clearance for the movement of the cover away from the top of the container during the sealing operation. Inasmuch as there is no contact between the clamp and the cover except at the center of the cover and with the jar except at each end of the legs 31 of the clamp, the cover has a free movement during the sealing operation except as limited by the pressure exerted by the spring on the center of the cover until displacement of the cover is sufficiently great to bring it into contact with the portions 34—34. This displacement can of course be regulated by varying the size and length of the parallel legs 31—31 or in other words by varying the amount of clearance between the slanting portions 34—34 of the clamp and the top of the cover 11.

Also it is to be understood that it is immaterial whether a positive attachment of the cover to the jar is desired for the purpose of preventing the spilling of the contents of the jar or a limiting movement of the cover when it is acting as a valve during the sealing operation is desired since the clamp of my invention may be used to accomplish either and both purposes. Obviously as far as the operation of the clamp during the sealing operation is concerned it is immaterial whether the movement of the cover to be checked is due to internal pressure from the container or release of pressure from the outside as for example where the jar is sealed in a retort from which retort air is being exhausted.

It is contemplated that in some instances two spring clamps such as the clamp 13 may be used placed at 90° from each other. In Figure 1 we have illustrated by the dotted lines a—a a position in which the clamp 13 could be rotated or moved or in which another spring clamp could be located at right angles to the spring clamp shown in full lines. The clamp 13 may be readily removed from the container or jar by manually depressing one of the portions 34—34 and thereafter moving the associated leg 31 clear of the shoulder 14.

Furthermore, it will be noted that due to the fact that the spring clamp 13 engages only the central portion of the top of the cover 11 the cover in being moved away from the container will tend to raise evenly all around its outer circumference. It therefore follows that when the cover is moved back to its seat on the top of the jar under the resilient effect or pressure of the spring clamp as well as the pressure of the atmosphere it will tend to seat evenly all around its outer circumference and in that way will adjust itself to any irregularities in the gasket 12 thereby resulting in the forming of a much better seal between the cover and container.

It is not to be assumed that the spring clamp 13 is only of use in connection with the sealing of the cover to the jar for it is contemplated that it may be used to hold the cover in proper relation to the jar during the handling of the empty jar with or without the sealing ring or gasket 12 in position; to hold the cover in proper relation to the container for handling or shifting in filled condition before the vacuumizing operation; to hold the cover in place on the jar after the sealing operation and before or during and after transportation and to hold the cover in place on the jar after the jar has been opened and part of the contents have been removed therefrom.

Another very important advantage of the spring clamp 13 is that as the cover is moved away from the upper end of the jar during the sealing operation this clamp 13 will apply an increasing pressure to the top of the cover. That is to say, the continued flexing of the spring clamp results in a constantly increasing amount of pressure being exerted on the cover 11 by the clamp due to the inherent construction of the clamp.

In Figure 4 we have illustrated the application of our invention to a vacuum jar having a seal of the internal type. In this modification of the invention the jar or container 10' has formed on it an annular shoulder 14' adapted to be engaged by the clamp 13' which is substantially identical to the clamp 13. The upper internal edge of the jar 10' is provided with a vertical surface 17' and two differently inclined surfaces 18' and 19' which cooperate to define a mounting for the gasket 12' on the upper end of the jar.

The cover 11' has an annular flange 23' which cooperates with an annular vertical portion 15' to define a seat 16' for the gasket.

It will be evident that when the gasket is compressed upon the differently inclined surfaces 18' and 19' by the cover 11', it will not only assume a wedge-like shape but will also bulge as indicated at 20' between the lower edge of the flange 23' of the cover 11' and the rim of the container 10'. The clamp 13' functions to connect the cover 11' to the container 10' in exactly the same way as the clamp 13 connects the cover 11 to the container 10.

The upper edge of the container 10' has formed in it a slot or notch 21' arranged to receive a pin 22 or some analogous instrument for breaking the seal established by the gasket 12' when it is desired to remove the cover 11 from the jar.

Now we desire it understood that although we have illustrated and described in detail the preferred embodiments of our invention, the invention is not to be thus limited but only insofar as defined by the scope and spirit of the appended claim.

We claim as our invention:

In combination in a vacuum jar construction with an outside seal of the class described, a container having the outer edge of its rim provided with a shoulder to form a seat for a gasket, a gasket resting on said seat, and a cover for cooperation with said gasket and arranged to serve as a valve during the sealing of the container, said cover having a substantially vertical flange for compressing the gasket on said seat, which flange terminates in an inwardly inclined surface which in turn terminates in a differently inclined surface, said inclined surfaces cooperating with said vertical flange in the compressing of the gasket, so that said gasket when compressed will bulge between the lower edge of the flange of the cover and the shoulder of said container, as well as between the extreme upper end of the container and said second mentioned slanting surface, and will overhang the peripheral edge of said shoulder and the upper end of the container.

In testimony whereof, we have hereunto subscribed our names.

WILLIAM B. WILLCUTT.
CHARLES A. SLEICHER.